US009677276B2

(12) United States Patent
Gilman

(10) Patent No.: US 9,677,276 B2
(45) Date of Patent: Jun. 13, 2017

(54) SUPPORT FOR EMBEDDING OBJECT IN CONCRETE

(71) Applicant: Gilman Construction Solutions, LLC, San Diego, CA (US)

(72) Inventor: Andrew Gilman, San Diego, CA (US)

(73) Assignee: Gilman Construction Solutions, LLC, San Diego, CA (US)

( * ) Notice: Subject to any disclaimer, the term of this patent is extended or adjusted under 35 U.S.C. 154(b) by 0 days.

(21) Appl. No.: 15/181,155

(22) Filed: Jun. 13, 2016

(65) Prior Publication Data
US 2017/0022711 A1     Jan. 26, 2017

Related U.S. Application Data

(60) Provisional application No. 62/197,052, filed on Jul. 26, 2015.

(51) Int. Cl.
| | |
|---|---|
| *E04C 5/16* | (2006.01) |
| *E04C 5/20* | (2006.01) |
| *E04G 17/02* | (2006.01) |
| *E04G 21/02* | (2006.01) |

(52) U.S. Cl.
CPC ............. *E04C 5/168* (2013.01); *E04C 5/163* (2013.01); *E04C 5/20* (2013.01); *E04G 17/02* (2013.01); *E04G 21/02* (2013.01)

(58) Field of Classification Search
CPC ............. E04C 5/16; E04C 5/167; E04C 5/168
USPC ............................................ 52/749.11, 125.1
See application file for complete search history.

(56) References Cited

U.S. PATENT DOCUMENTS

| | | | | |
|---|---|---|---|---|
| 3,579,938 A | * | 5/1971 | Hanson ................... | E04F 21/05 248/230.2 |
| 4,141,310 A | * | 2/1979 | Rich, Jr. ................. | G01F 23/00 116/227 |
| 5,590,494 A | * | 1/1997 | Miller ..................... | E02D 27/28 248/156 |
| 5,595,039 A | * | 1/1997 | Lowery ................... | E04C 5/206 52/677 |
| 5,603,187 A | * | 2/1997 | Merrin .................... | E04D 13/12 248/237 |
| 5,791,096 A | * | 8/1998 | Chen ................. | E04F 15/02458 52/126.6 |

(Continued)

FOREIGN PATENT DOCUMENTS

| | | |
|---|---|---|
| RU | 2104414 C1 | 2/1998 |
| SU | 1618908 A1 | 1/1991 |
| WO | WO 2012/107442 A1 | 8/2012 |

OTHER PUBLICATIONS

International Search Report and Written Opinion in PCT Application No. PCT/US2016/043871 dated Nov. 24, 2016.

*Primary Examiner* — Beth Stephan
(74) *Attorney, Agent, or Firm* — Knobbe Martens Olson & Bear LLP

(57) ABSTRACT

A system for supporting and holding in place an object (for example and not by way of limitation, anchor bolts, steel plates and the like) to be embedded in concrete. A device having a shaft and a tower can be used to support the object, by inserting the shaft into an opening in the tower and rotatably locking the shaft in place at the desired height, an embed can be supported in the desired position. Concrete can be poured around the support to embed the object at the desired position within the concrete.

19 Claims, 11 Drawing Sheets

(56) References Cited

U.S. PATENT DOCUMENTS

| | | | |
|---|---|---|---|
| 6,202,369 B1* | 3/2001 | Partee | E04H 12/2269 248/523 |
| 6,206,613 B1* | 3/2001 | Elkins | F16L 3/02 248/49 |
| 6,536,717 B2* | 3/2003 | Parker | F16L 3/11 248/346.01 |
| 6,722,097 B2* | 4/2004 | Haslem | E04C 5/20 52/323 |
| 6,964,115 B2* | 11/2005 | Kim | E04G 21/10 116/227 |
| 7,610,728 B1* | 11/2009 | Manocchia | E02D 27/01 248/357 |
| 2002/0148173 A1* | 10/2002 | Kugler | E04F 15/02183 52/126.6 |
| 2003/0033760 A1* | 2/2003 | Rogers | E02D 27/34 52/167.7 |
| 2004/0035064 A1* | 2/2004 | Kugler | E04F 15/02183 52/126.6 |
| 2004/0088945 A1* | 5/2004 | Owen | E01C 23/01 52/677 |
| 2004/0261329 A1* | 12/2004 | Kugler | E04F 15/02183 52/126.6 |
| 2008/0028718 A1* | 2/2008 | Erickson | E04C 5/206 52/687 |

\* cited by examiner

SUPPORT FOR EMBEDDING OBJECT IN CONCRETE

CROSS REFERENCE TO RELATED APPLICATIONS

Any and all applications for which a foreign or domestic priority claim is identified in the Application Data Sheet as filed with the present application are hereby incorporated by reference under 37 CFR 1.57. This Application claims the benefit of priority of U.S. Provisional Application No. 62/197,052, filed Jul. 26, 2015, the entire contents of which are herein incorporated by reference.

BACKGROUND

The present invention relates generally to tools used to embed objects, such as steel plates, door closers, electrical boxes, structural embeds, anchor bolts, forms, and the like into concrete slabs.

SUMMARY OF THE DISCLOSURE

Embodiments of the present invention provide a system for supporting and holding in place an object (for example and not by way of limitation, anchor bolts, steel plates and the like) to be embedded in concrete. Embodiments of the present invention significantly reduce the amount of time and materials required to install embeds by only requiring the contractor to attach the embed to a device in accordance with embodiments of the present invention, set the device to the desired height, install, and pour the concrete. There is no set up or clean up required, nor are there wasted materials or labor after the embed has been cast.

BRIEF DESCRIPTION OF THE DRAWINGS

The novel features of the invention are set forth with particularity in the claims that follow. A better understanding of the features and advantages of the present invention will be obtained by reference to the following detailed description that sets forth illustrative embodiments, in which the principles of the invention are utilized, and the accompanying drawings of which:

DETAILED DESCRIPTION

In almost every construction project, the design calls for certain structures, elements, or other objects to be embedded in concrete. These objects are generally placed within the concrete forms, and then concrete is poured into the forms, thus embedding the object in the poured concrete. One example of these "embeds" is a steel plate with steel anchors, which is cast into the slab in order to facilitate the future connection of a steel member, such as a column or support, to the concrete slab. The first step of the current method used to set these embeds involves attaching the steel plate to be embedded to a wood support (usually 2×4s or plywood) built specifically for each embed. If the embed is located near the slab edge, the wood support with the embed attached is nailed to the edge form. If the embed is located away from the slab edge, L-angles (typically shelf brackets used to support shelves) are installed on the deck formwork (or supported in the ground in the case of a slab on grade) in order to secure the wood support with the embed attached thereto. The wood support is then screwed to the L-angles. The concrete is poured and cured. The L-angles are taller than the slab depth making it necessary to grind off excess material of the L-angle remaining above the slab after the pour. Current methods for embedding these objects into concrete are very time consuming, as each embed requires the contractor to set up equipment (such as saws, power cords, etc.), procure materials (such as plywood, 2×4s, and the like), cut and assemble a custom support for each embed, and then remove any excess portions of the support after pouring the concrete. For example, when L-angles are used, the contractor is required to grind down the L-angle that is left exposed above the slab.

The present disclosure describes a system for supporting and holding in place an object (for example and not by way of limitation, anchor bolts, steel plates and the like) to be embedded in concrete. Embodiments of the present invention significantly reduce the amount of time and materials required to install embeds by only requiring the contractor to attach the embed to a device in accordance with embodiments of the present invention, set the device to the desired height, install, and pour the concrete. There is no set up or clean up required, nor are there wasted materials or labor after the embed has been cast.

Figure 1A:
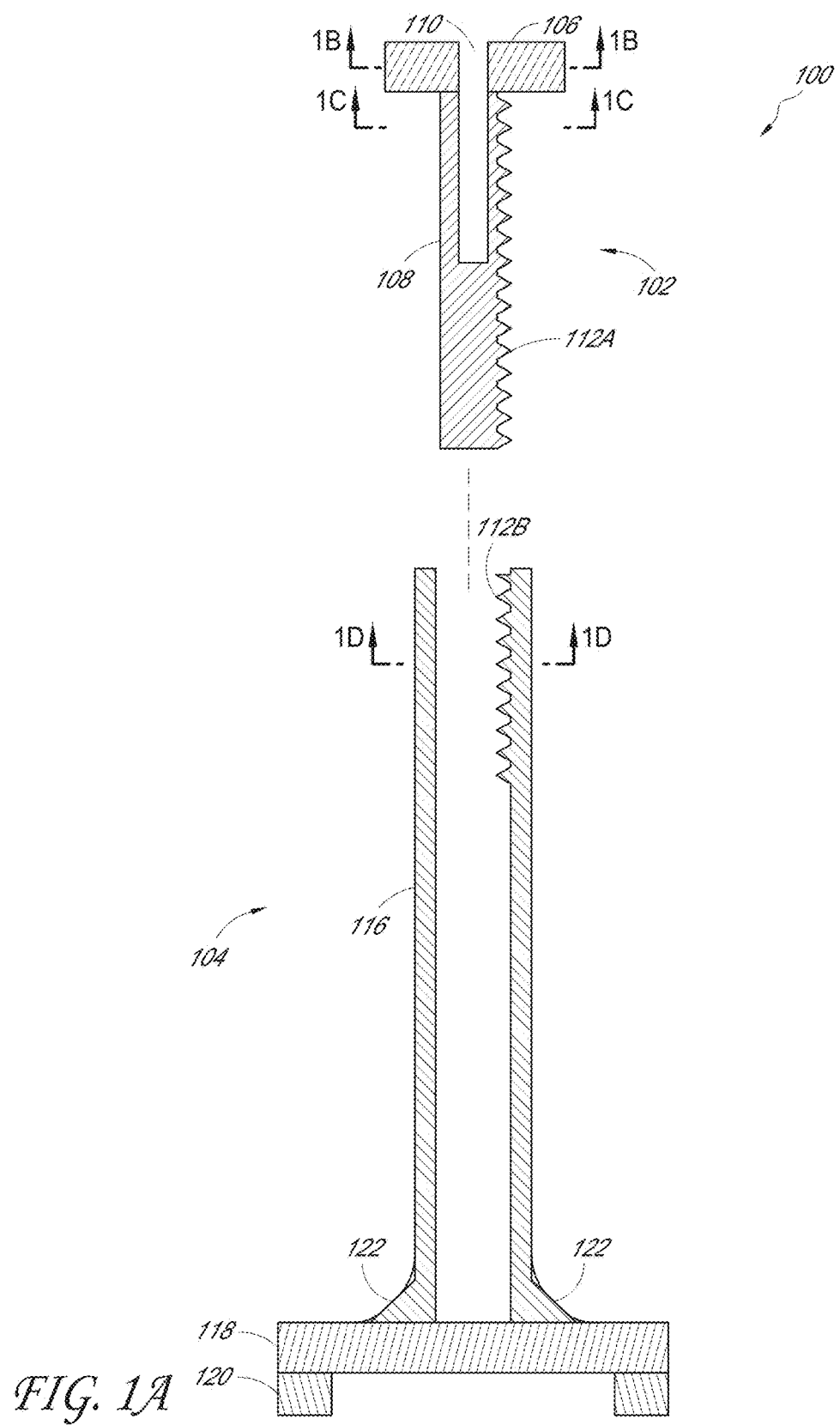
FIG. 1A depicts a cross section of a dissembled embodiment of a support.

Referring to FIG. 1A, device 100, in accordance with an embodiment of the present invention, comprises support shaft 102 and tower 104, where support shaft 102 is adapted to mate with tower 104, and when adjusted to the desired height tower 104 and shaft 102 are locked together (locking may be permanent or nonpermanent, the latter provided to readjust the height). The skilled artisan will appreciate that device 100 may be provided as a single unit, and the two separated pieces are exemplary.

Support shaft 102, in accordance with one embodiment, has platform 106 on which the object (not shown) to be embedded rests. Platform 106 is connected or integrally formed with rod 108, and rod 108 has locking teeth 112A that mate and lock with teeth 112B on tower 104 (described more fully below). Preferably teeth 112A are ridges embedded into the material of rod 108 (FIG. 1C), where the ridges are downwardly directed (not shown) in order to mate and lock with teeth 112B as described herein. In some embodiments, pilot hole 110 is formed in or through platform 106. In some embodiments, the pilot hole 110 extends through the shaft 108. The pilot hole 110 is used to aid in mounting the object (not shown) on platform 106, for example, by using a screw, rod, rivet, or other attachment device.

Figure 1B:
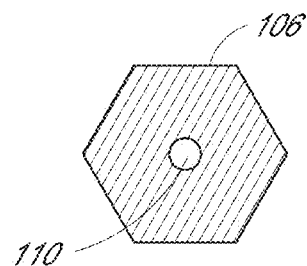
FIG. 1B depicts a cross section of the support shaft of FIG. 1A taken along line 1B-1B'.
Figure 1C:
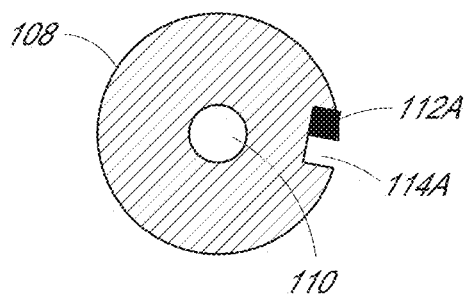
FIG. 1C depicts a cross section of rod of FIG. 1A taken along line 1C-1C'.

Referring to FIGS. 1B-1C, cross sections of support shaft 102 are provided. Platform 106 has a hexagonal shape, but the present disclosure is not limited thereto. Rod 108, in this embodiment, has a circular cross-section. However, the skilled artisan will recognize that other cross-sectional shapes will fall within the inventive concepts. For example and not by way of limitation oval, hexagonal and other shapes will work, but circular is preferred for ease of manufacture. Groove 114A extends vertically along rod 108 and in proximity to locking teeth 112A. Groove 114A slides over teeth 112B to permit rod 108 slide into and out of tower 104.

Referring again to FIG. 1A tower 104 has main body 116, base 118 and feet 120. Feet 120 are optionally present to minimize surface area contact of base 118 with the concrete forms (not shown). Holes (not shown) can also be provided in feet 120 or base 118 to secure device 100 to the forms. The skilled artisan will appreciate base 118 may have any appropriate or desired shape to achieve the purpose of supporting device 100 under the required loads to support the object. In some embodiments, base 118 has a tripod configuration where the three legs extend from body 116 at right angles (making them sit flat against a surface), although other angles may be chosen, and this preferred embodiment has three feet on the bottom of each leg. In an embodiment where the three legs extend from body 116 at angles greater than 90 degrees, feet 120 may not be present. Fillets 122 may optionally be included to enhance the structural strength of tower 104.

Figure 1D:
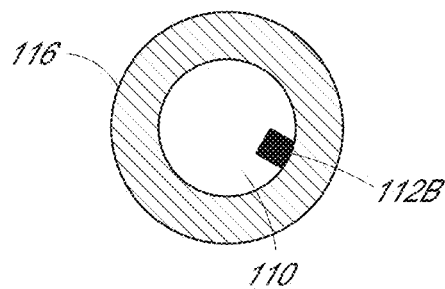
FIG. 1D depicts a cross section of the tower body of FIG. 1A taken along line 1D-1D'

Referring to FIG. 1D, the cross-section of tower body 116 has a shape matching that of rod 108 to receive rod 108 therein. In some embodiments, a groove may extend vertically along the inside of tower body 116 mirroring groove 114A, and would receive teeth 112A of shaft 108, if teeth 112A extended externally from the surface of shaft 108, rather than as shown in FIG. 1C.

In use, the object is rested or secured to platform 106. Rod 108 slides into and down main body 116 of tower 104, where teeth 112B slide along respective grooves 114A until platform 106 and the object are at the desired height, then rod 108 and body 116 are rotated relative to each other interlocking teeth 112A and 112B, thereby locking rod 108 and body 116 so they may not slide up and down relative to each other. In an alternative embodiment a ridge (not shown) may be provided at the base of the teeth 112A such that as teeth 112B are rotated over the ridges the device clicks into a locked or semi-locked position. If the holes (not shown) are provided in feet 120, they may be secured to the concrete forms (not shown), if not previously secured. The skilled artisan will appreciate that these steps may take place in any order as desired. Further the skilled artisan will recognize the teeth 112A and 112B may be replaced by any suitable mechanism to lock or fix rod 108 relative to body 116. For example and not by way of limitation, instead of teeth extending around only a portion of rod 108 and body 116, threads may extend all the way around and be pitched to mate with each other in a manner well known, obviously in this embodiment the grooves are not necessary. Rod 108 and body 116 would slide vertically relative to each other in this alternative embodiment by rotating either or both such that the threads moved one relative to the other until the desired height is attained.

In some embodiments, device 100 may be made from injection molded plastic with suitable structural characteristics in combination with the design of device 100 to structurally support the object. The skilled artisan will recognize many other materials from which device 100 may be manufactured, including without limitation cast aluminum. Preferably either or both rod 108 and body 116 are marked with measurements to allow the user to determine height without the need to use a measuring tape.

Figure 2:
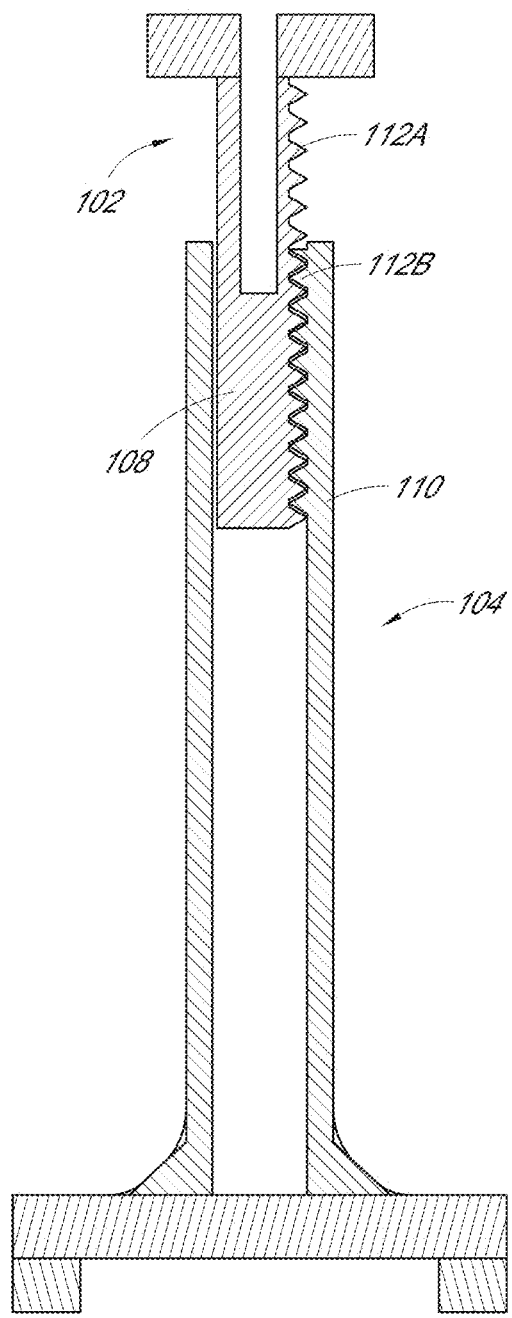
FIG. 2 depicts a cross section of an assembled embodiment of the rod and tower of FIG. 1

Referring to FIG. 2, the assembled support is shown, with the rod 108 disposed within the tower body 116.

Figure 3A:
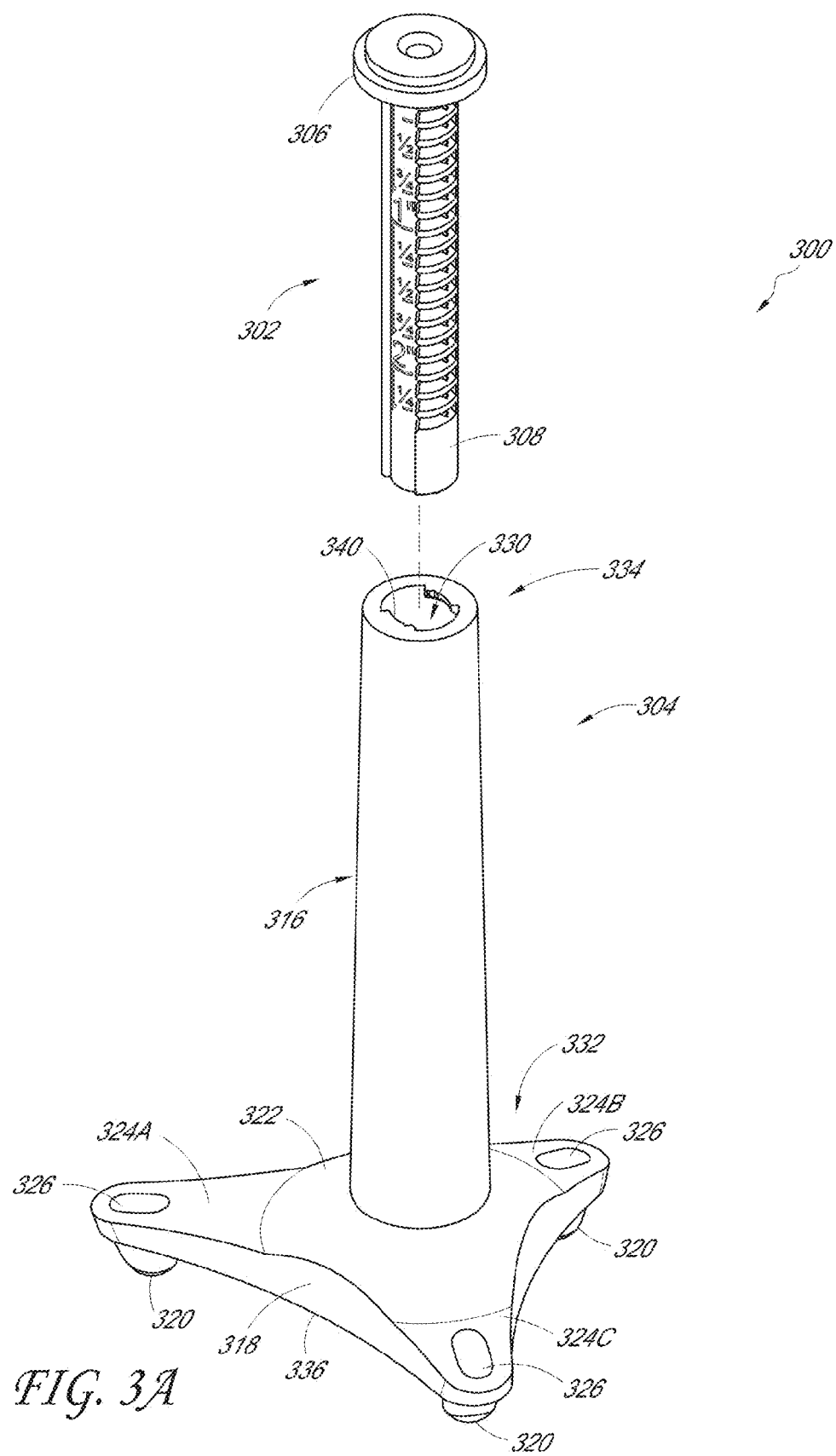
FIG. 3A is a perspective view of an embodiment of a support.

Referring to FIG. 3A, a support 300 comprises a tower 304 and a shaft 302. The shaft 302 is configured to be inserted into the tower 304, and to adjustably slide up and down within the tower 304, as will be described in greater detail below. The tower 304 comprises a tower body 316 and a base 318, which is attached to a first end 332 of the tower body 316. The tower body 316 and the base 318 can be integrally formed as a single piece, or can be separately formed and attached together by gluing, ultrasonic welding, and the like. The tower body 316 extends perpendicular to a plane of a bottom 336 of the base 318 such that the when the base 318 is placed on a surface, the tower body 316 extends perpendicular to the surface on which the base 318 is placed. in some embodiments, the tower body 316 can be connected to the base 318 at any desired angle, such that when the base 318 is attached or placed on a surface, the tower body 316 can extend at an angle of 30°, 45°, 60°, relative to the surface on which the base 318 is attached. In such embodiments, the platform of the shaft 302 can be similarly angled such that a surface of the platform extends perpendicular to the surface on which the base is attached.

The tower body 316 is formed an opening 330 disposed axially along a portion of the length of the tower body 316. The opening 330 is configured to receive an end of the shaft 302. In some embodiments, the opening 330 extends along the entire length of the tower body 316 and through the base 318. In some embodiments, the opening 330 extends along only a portion of the tower body 316.

In some embodiments, the tower body 316 can have a tapering inner diameter. As shown in FIG. 3A, the inner diameter of the first end 332 of the tower body 316 is larger than the inner diameter of a second end 334 of the tower body 316. The inner diameter of the tower body 316 gets smaller as the tower body 316 extends away from the base 318 and first end 332 of the tower body 316 toward the second end 334 of the tower body 316. The taper of the tower body 316 can provide extra strength for the tower 304 to support an embed, or an object to be embedded in the concrete.

One or more locking members 340 can be formed within the opening 330 at the second end 334 of the tower body 316. In some embodiments, two locking members 340 are formed within the opening 330 on opposing sides of the opening 330. In some embodiments, the locking members 340 can be formed within the opening 330, on the inner surface of the tower body 316, at any position along the length of the tower body 316. The distance between the locking members 340 can correspond to the diameter of the shaft 302, which will be described in greater detail below. The locking members 340 interact with corresponding features on the shaft 302 which will be described in greater detail below.

In some embodiments, two locking members 340 can be disposed on opposing surfaces on the inner surface of the tower body 316, in the same plane. In some embodiments, one or more additional locking members 340 can be disposed farther down within the opening 330, on the inner surface of the tower body 316, formed in a plane parallel to the plane of the other locking members 340, spaced apart at a distance equivalent to the surfaces of corresponding locking channels formed on the rod portion 308, which will be described in greater detail below. In this way, the shaft 300 can support more weight, or support a heavier embed, as the two levels of locking tabs 340 can provide additional surfaces on which the weight of the embed can be distributed.

The base 318 comprises one or more legs 324. As depicted, the base 318 includes 3 legs 324, disposed equidistant from each other around the base 318, and extending radially from the center of the base 318 and the center of the tower body 316. Each of legs 324 can include a foot 320 attached thereto. The feet 320 can taper such that the diameter of the foot 320 is larger near the base 318, and narrows as the foot 320 extends away from the base 318. In this way, the foot 320 minimizes the footprint of the support as it is cast into the concrete, such that the support is nearly invisible when viewed from below, where, for example, the concrete slab is an overhead slab, or is accessible from below.

The legs 318 may include throughholes 326. Throughholes 326 can extend through the feet 320, such that an anchoring device can be driven through the legs 324 and the feet 320, to anchor the base 318 to a surface. For example, the base 318 can be placed on a surface within a concrete form to support an embed within a concrete slab to be poured. In order to ensure accurate placement of the embed, the support 300 should stay firmly in place when attaching the embed to the support 300 (which will be described in detail below), and when pouring the concrete. To ensure the base 318, and thus the support 300, stays in the desired position, an anchor can be inserted into each of the throughholes 326, through the feet 320, and into the surface on which the base 318 is placed. in some embodiments, the anchor can be a nail, screw, rivet, bar, rod, bolt, or any other desired attachment anchor. The head of the anchoring device, such as the head of the nail, can be larger in diameter than the diameter of the throughhole 326 (or the largest dimension of the throughhole 326 if the throughhole 326 is not circular), so that the shaft of the nail goes through the throughhole 326 and into the surface on which the base rests, while the head of the nail impinges the base 318. This will hold the base 318 firmly in place during use.

In some embodiments, one or more of the throughholes 326 can extend through the base 318 and the foot 320 at an angle other than perpendicular to the plane of the bottom 336 of the base 318. For example, the throughhole 326 located in the leg 324a which is longer than legs 324b and 324c can have an inner surface which is not perpendicular to the surface on which the base 318 can be placed, or which is not parallel to the direction in which the tower body 316 extends. Having an angled throughhole 326 in one or more of the legs 324a-c may allow for greater flexibility to use the support 300 in areas or places that are more difficult to access. For example, where a nail is used for attaching the base 318 to a surface, and an object to be embedded is attached to the shaft 302, the distance between the surface, and an underside of the object to be embedded is a fixed distance, which may not be sufficient to allow a user to swing a hammer sufficiently to drive the nail into the surface. By having an angled throughhole 326, the distance for swinging a hammer can be increased. If the angle of the throughhole 326 is great enough, the object to be embedded may not be in the swinging path of the hammer.

Figure 3B:
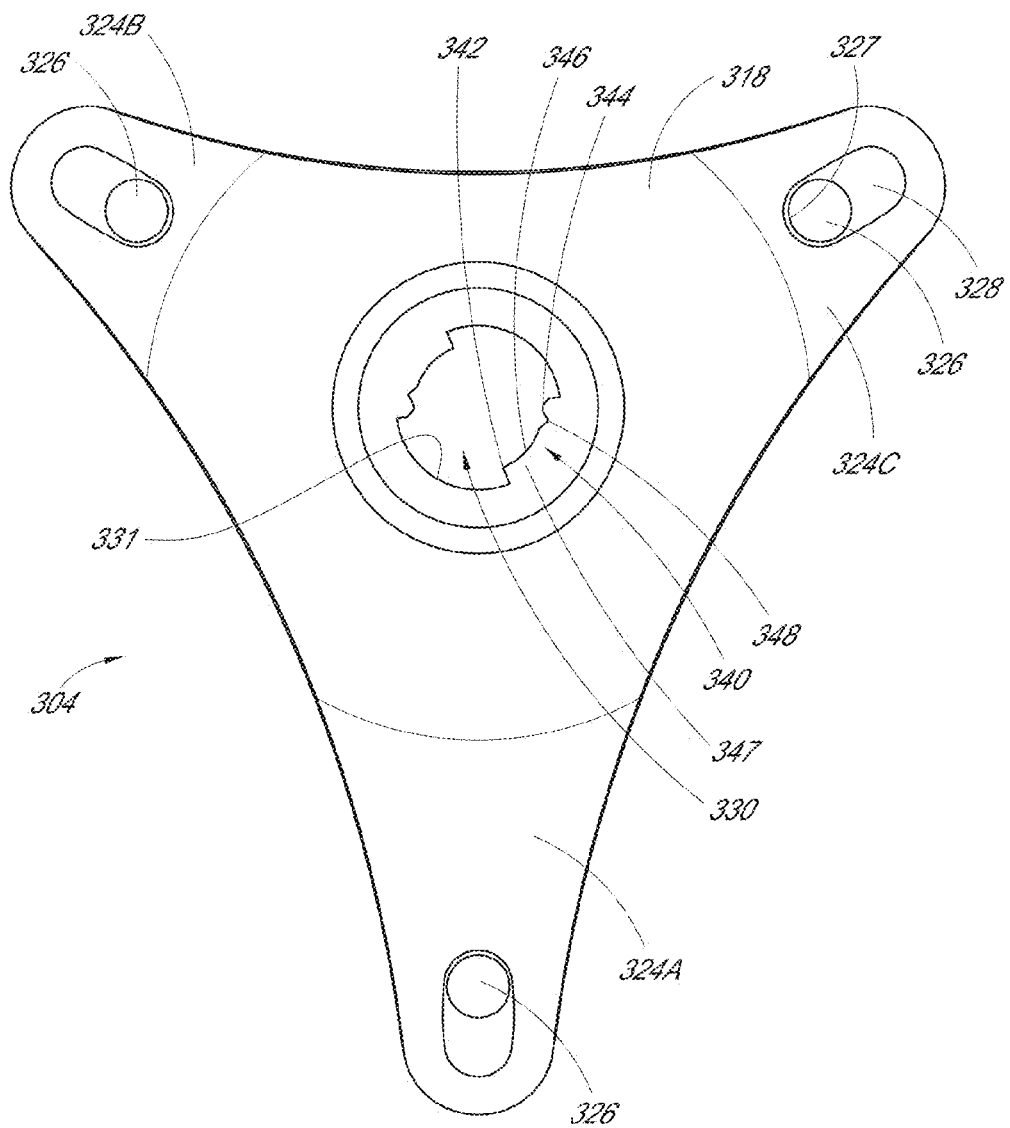
FIG. 3B is a top view of the tower portion of FIG. 3A.

In some embodiments, the throughhole 326 can have a varying diameter along the length of the throughhole 326. For example, as seen in FIG. 3B, the throughhole 326 can have an inner portion 327 which extends perpendicular to the plane of the bottom 336 of the base 318, and an outer portion 328, which extends at an angle other than perpendicular to the plane of the bottom 336 of the base 318. Thus, a nail, or other anchor device, can be driven in at an angle other than perpendicular to the surface on which the base 318 is placed.

In some embodiments, the legs 324 may be of different lengths. For example, as depicted, a first leg 324a is longer than the other legs 324b and 324c. The different lengths of the legs 324 can ensure that a user has options for securing the post. For example, the geometry or dimensions of an object to be supported extend in such a way as to interfere with the throughholes 326, or which do not allow sufficient room for a nail or other anchor device to be driven through the throughhole 326. By extending the first leg 324a a distance farther from the central axis of the tower 304, the throughhole 326 is moved farther from the central axis of the tower 304, and farther from a potentially interfering object to be supported. Thus, by extending one leg, a user may have sufficient room to swing a hammer in order to drive a nail through the throughhole 326 in the first leg 324a, whereas there may not be sufficient room to drive a nail through the throughholes 326 in the other legs 324b and 324c. The length of the first leg 324a can also provide greater flexibility in nailing, since it offers a different nailing point than the other legs 324b and 324c. For example, the longer first leg 324a may be over a different type of subgrade or nailing surface than the other legs 324b and 324c.

In some embodiments, the base 318 includes a supporting Fillet 322, which surrounds the tower body 316, and which provides structural support for the tower body 316. In some embodiments, the supporting Fillet 322 may be omitted, or may be of another design. A person of skill in the art, guided by this disclosure, would understand that structural support for the tower body 316 can be provided in various ways in addition to the supporting Fillet 322.

FIG. 3B depicts a top view of the tower 304. The locking mechanisms 340 can be seen on opposing sides of the opening 330. The locking mechanisms 340 each comprise a first end 342, a second end 344, an inner surface 346, a top surface 347, and a notch 348, which is formed as an indent or depression in the inner surface 346. The notch 348 is formed in the inner surface 346 in a direction extending from the center of the opening 330 radially outward toward the tower body 316. The inner surface 346 is curved, and follows the contour of an inner surface 331 of the opening 330. The inner surface 346 curve also corresponds to the outer surface of the shaft 302, which will be described below.

Figure 4A:
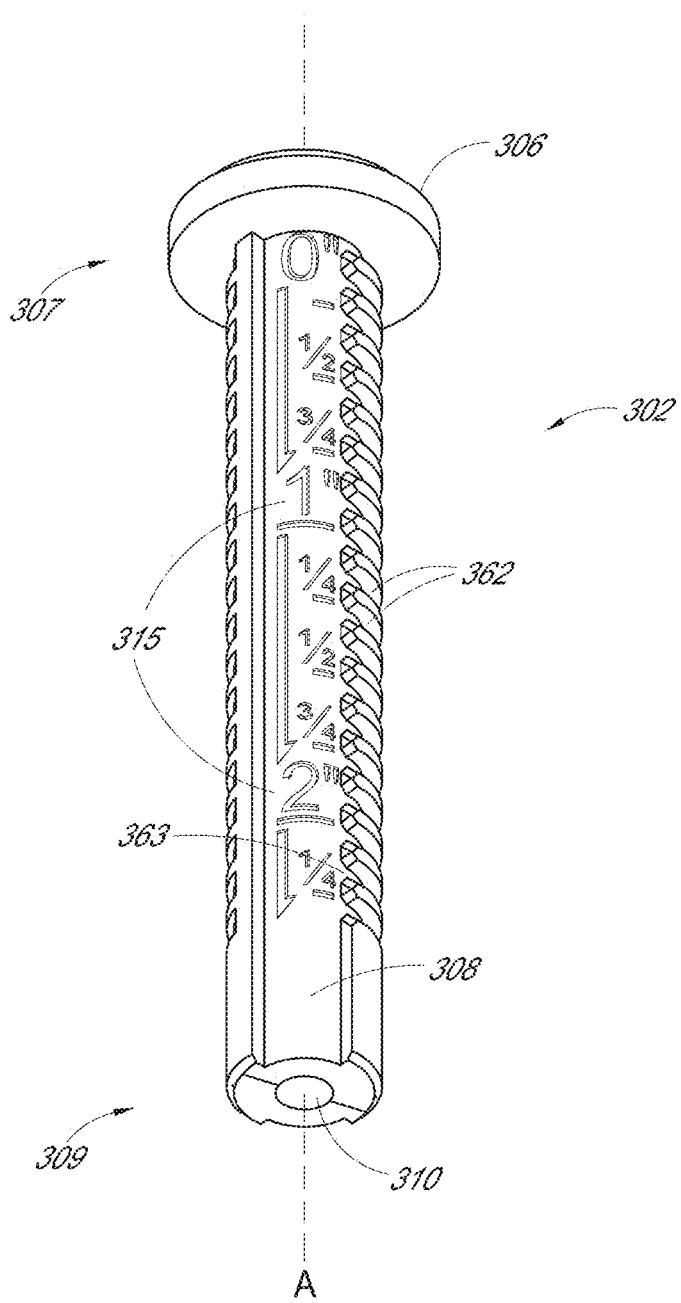
FIG. 4A is a perspective view of an embodiment of a shaft portion of a support.

FIG. 4A depicts an embodiment of the shaft 302, sized and shaped to fit into the opening 330 of the tower 304. The shaft 302 comprises a platform 306 and a rod portion 308. The platform 306 is located at a first end 307 of the shaft 302, and comprises a planar surface disposed perpendicular to an axis A of the rod portion 308. The platform 306 can be circular, rectangular, square, or any other shape, as desired. The platform 306 is formed with a pilot hole 310 therein. The pilot hole 310 can be a hole, an indentation, a throughhole, and the like. The pilot hole 310 is formed in the center of the platform 306 and can be axially aligned with the axis A of the rod portion 308 of the shaft 302. In some embodiments, the pilot hole 310 can extend the length of the shaft 302, from the first end 307 in the platform 306, through to a second end 309.

The pilot hole 310 is configured to receive an attachment device (not shown), such as a screw, a nail, a bolt, and the like. In some embodiments, the pilot hole 310 may have an internal thread formed therein to mate with threads on a screw or bolt inserted into the pilot hole 310. In this way, an attachment device can be releasably retained within the pilot hole 310, and an embed can be securely attached to the shaft 302, as will be described elsewhere herein. In some embodiments, the pilot hole 310 may not have a threaded pilot hole 310.

Figure 4B:
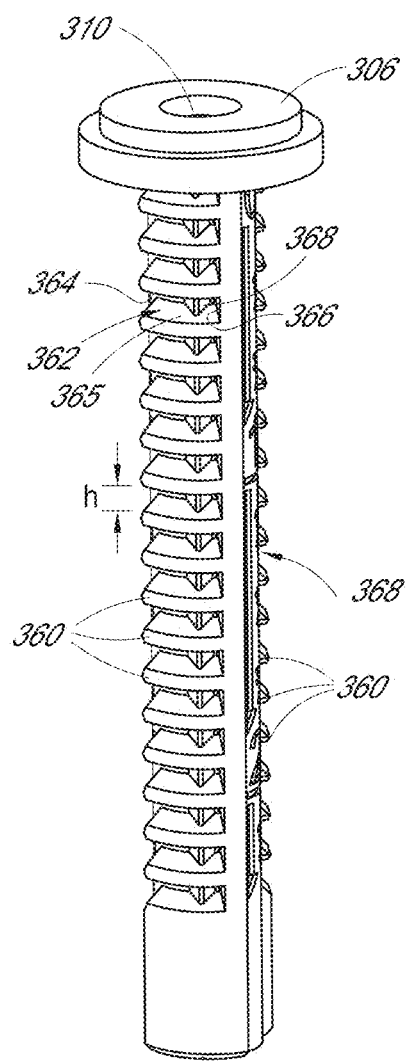
FIG. 4B is a front view of the shaft portion of FIG. 4A

As shown in FIGS. 4A and 4B, the rod portion 308 comprises two sets of locking threads 360 formed on opposite sides of the rod portion 308. The locking threads 360 are formed radially around the outer surface of the rod portion 308. In some embodiments, each of the sets of locking threads 360 together extend around about one-half of the circumference of the rod portion 308. In some embodiments, the locking grooves extend around less or more than one-half of the circumference of the rod portion 308. The locking threads 360 can be formed in parallel planes along a length of the rod portion 308. The sets of locking threads 360 comprise a plurality of locking channels 362. The plurality of locking channels 362 each comprise a channel opening 363, an upper surface 364, a lower surface 365, a stop 366, and a locking ridge 368. The locking channel 362 has a height h, which is sized to accept one of the locking members 340 formed in the opening 330 on the tower 304. The upper surface 364 is a planar surface extending radially around the rod portion 308, parallel to the platform 306, and perpendicular to the axis A of the rod portion 308. The upper surfaces 364 of each of the locking threads 360 can be formed in parallel planes.

The lower surface 365 can be a planar surface, or can be a tapered surface of increasing diameter, increasing along a direction from the first end 307 to the second end 309 of the shaft 302. The stop 366 is a planar surface formed perpendicular to the top surface 364 and the lower surface 365, and protrudes from the rod portion 308 radially outward, perpendicular to the axis A. The stop 366 is formed at an end of the locking channel 362 opposite the opening 363.

The locking ridge 368 is a ridge, bump, protrusion, tab, or other similar feature that extends radially outward from the rod portion 308, and extends from the lower surface 365 to the upper surface 364. The locking ridge 368 is disposed proximate the stop 366, away from the channel opening 363. The locking ridge 368 is sized and shaped to mate with the notch 348 formed in the locking tab 340, as will be described in greater detail below.

The rod portion 308 also comprises measurement indicators 315. The measurement indicators 315 comprise markings, numerals and units, such as inches, centimeters, and the like. The markings are aligned with upper surfaces 364 and correspond to specific measurements, whose use will be described in greater detail below. The measurements indicators 315 can be in increments of 1 mm, 10 mm, 1 cm, 2 cm, 1/16", 1/8", 1/4", 1/2", or any other unit of length. When the shaft 302 is inserted into the opening 330 of the tower 304 and locked in place (as will be described below), one of the markings of the measurement indicators 315 will align with the second end 334 of the tower body 316. The measurement indicator 315, that is, the marking and the corresponding numeral and unit (e.g., 1¼ inch) aligned with the top of the tower 304, correspond to the height of the platform 306 from the surface on which the tower 304 is located. For example, when the shaft 302 is installed in the tower 304, the measurement indicator 315 aligned with the second end 334 of the tower body 316 corresponds to the distance from the bottom of the feet 320 and the planar surface of the platform 306. In some embodiments, the measurement indicators will indicate the entire distance, such as 7 inches, 8½ inches, or any other desired measurement. In some embodiments, the measurement indicators 315 will correspond to the distance between the top of the tower 304, or the second end 336 of the tower portion 316, and the surface of the platform 306. In this case, the tower portion 316 can have a height indicator thereon. For example, the tower platform may have a 5 inch, 6 inch, 7 inch, etc. marking thereon to indicate how tall the tower 304 is, or the distance between the feet 320 and the second end 334 of the tower body 316. Then, to determine the distance between the surface on which the tower 304 is placed and the platform 306, a user can add the distance measurement on the tower body 316, e.g., 7 inches, to the measurement indicator 315 on the shaft 302, e.g., 1½ inches, to get an overall height of 8½ inches. Thus, a user can determine how far the platform is off the surface on which the tower 304 is placed. In some embodiments, the shaft 302 may not have a measurement indicator 315 thereon. The user may use a measuring device, such as a ruler or tape measure, to measure and/or set the height of the platform 306 above the surface on which the tower 304 is placed.

Figure 5:
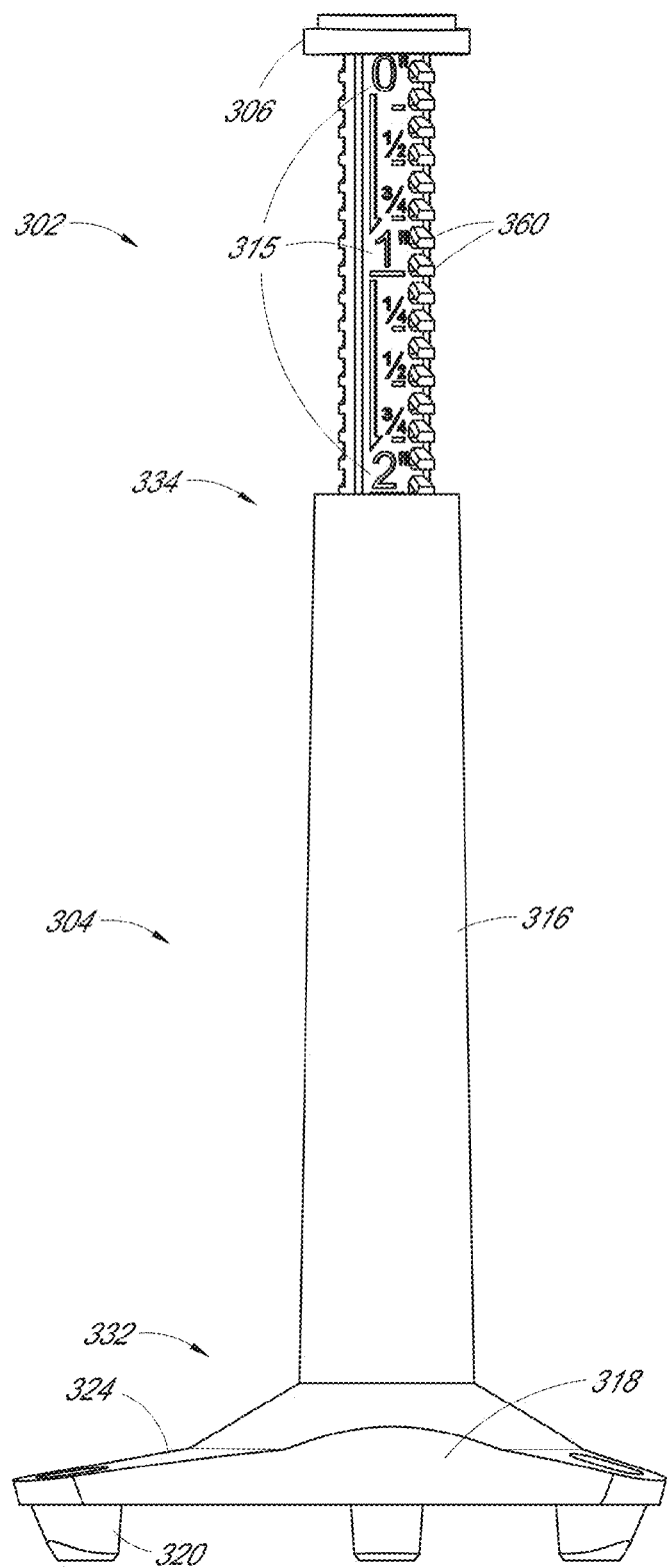
FIG. 5 is a perspective view of a support having a shaft portion inserted into the tower portion.

FIG. 5 depicts the support 300 in an assembled state, with the rod portion 308 inserted into the tower body 316 to the desired height and releasably retained within the tower body 316 by the interaction between the locking tab 342 and the locking threads 360.

Operation of the support 300 will now be described. As an example, the support 300 can be used in an application that requires suspending an electrical box, such as for a floor outlet, in a concrete slab. In this example, the slab will be 8½ inches thick, and a support 300 having a seven inch tower is used. A concrete form is prepared, or has previously been prepared. In this example, the concrete slab is assumed to be on grade, or on a prepared substrate. The tower 304 is placed in the form on the grade or prepared substrate. The tower 304 is positioned within the form at the desired location of the electrical box. The tower 304 is attached to the grade or the substrate using nails or screws, or other desired fasteners.

Once the tower 304 is positioned, the shaft 302 is inserted into the opening 330 in the tower body 316. To insert the shaft 302, the shaft 302 must be inserted such that the locking threads 360 are not aligned with the locking tabs 340. That is, the shaft 302 is inserted so that the portion of the rod portion 308 which is does not include the locking threads 360 is axially or vertically aligned with the locking tabs 340 The diameter or cross-sectional area of the rod portion 308 is smaller than the diameter of the opening 330, so the rod portion 308 will be easily received into the opening. The rod portion 308 is inserted until the desired the measurement indicator 315 corresponding to 1½ inches is aligned with the second end 334 of the tower body 316. By setting the rod portion 308 at the 1½ inch measurement indicator 315, the platform 306 is positioned 1½ inches above the top of the tower body 304, which is 7 inches tall, for a total height from the grade or substrate of 8½ inches.

When the shaft 302 is at the desired position, the shaft 302 is rotated about axis A. As the shaft 302 rotates, the first end 342 of the locking tab 340 is received into the channel opening 363. The first end 342 of the locking tab 340 may impinge the tapering lower surface 365, and, as the shaft 302 is further rotates, the first end 342 can travel along the lower surface 365. The top surface 347 may impinge the upper surface 364 of the locking channel 362 into which the locking tab 340 has been received. The inner surface 346 of the locking tab 340 also slides along an outer surface of the rod portion 308 as the shaft 302 is rotated.

As the shaft 302 is rotated further, the first end 342 impinges on the ridge 368 and slides over the ridge 368. As the shaft 302 is rotated even further, the ridge 368 will align with the notch 348, and the ridge 368 will be received into the notch 348. The notch 348 is spaced from the first end 342 of the locking tab 340 such that when the notch 348 receives the ridge 368, the first end 342 will impinge on the stop 366. The stop 366 will prevent further rotation of the shaft 302. The fit between the notch 348 and the ridge 368 will provide a locking function, preventing the shaft 302 from being accidentally or inadvertently rotated. However, the shaft 302 can still be rotated to release the locking tab 340 from the locking channel 362 by the application of sufficient force. This process has been described for one locking tab 340 interacting with one locking thread 360, however, a person of skill in the art will understand that where two sets of locking threads 360 and two locking tabs are provided, the same procedure described above will occur at the same time for both locking tabs 340 and for two locking threads 360.

In some embodiments, the rod portion may comprise 1 or more sets of locking threads 360. In some embodiments, the rod portion may comprise 2, 3, 4, 5, 10, 20, or more sets of locking threads 360, as desired to establish or set a desired height increment by which the shaft 302 can be adjusted. If a smaller increment is desired, more locking threads 360, space closer together, can be used. In some embodiments, the tower body 316 may comprise 1, 2, 3, 4 or more locking tabs 340. In this case, the process described above would occur at the same time for the number of locking tabs 340 interacting with a corresponding number of locking threads 360.

In some embodiments, the shaft 302 can be rotated into the desired position, and the platform set to the desired height prior to attaching the tower 304 to the grade or prepared substrate.

After the shaft 302 has been locked into the desired position (as shown in FIG. 5), the electrical box can be connected to the platform 306 using the pilot hole 310. The electrical box may have a mounting hole or a screw hole formed therein. The mounting hole (not shown) in the electrical box (not shown) is positioned over the pilot hole 310 in the shaft 302, and a screw, nail, or other attachment mechanism is inserted into the mounting hole and the pilot hole 310 to attach the electrical box to the platform 306.

When the support 300 has be positioned within the frame, set to the desired height, as indicated on the measurement indicators 315, and the electrical box is attached via the pilot hole 310, the concrete can be poured into the frame. The concrete will flow around the support 300 and the portion of the electrical box to be embedded in the concrete. The support 300 will hold the electrical box in position as the concrete is poured. After the concrete is finished, such as troweled, floated, etc. to the desired thickness and the concrete has cured, the screw or attachment mechanism can be removed from the mounting hole of the electrical box and the pilot hole 310 of the support 300, resulting in the electrical box being positioned within the slab at the desired position.

The order in which the components of the support 300 are used can vary without departing from the scope of the present disclosure. For example, a user may set the shaft 302 to the desired height, attach the object to the platform 306 using the pilot hole 310, then attach the the tower 304 to the grade or prepared substrate.

Figure 6:
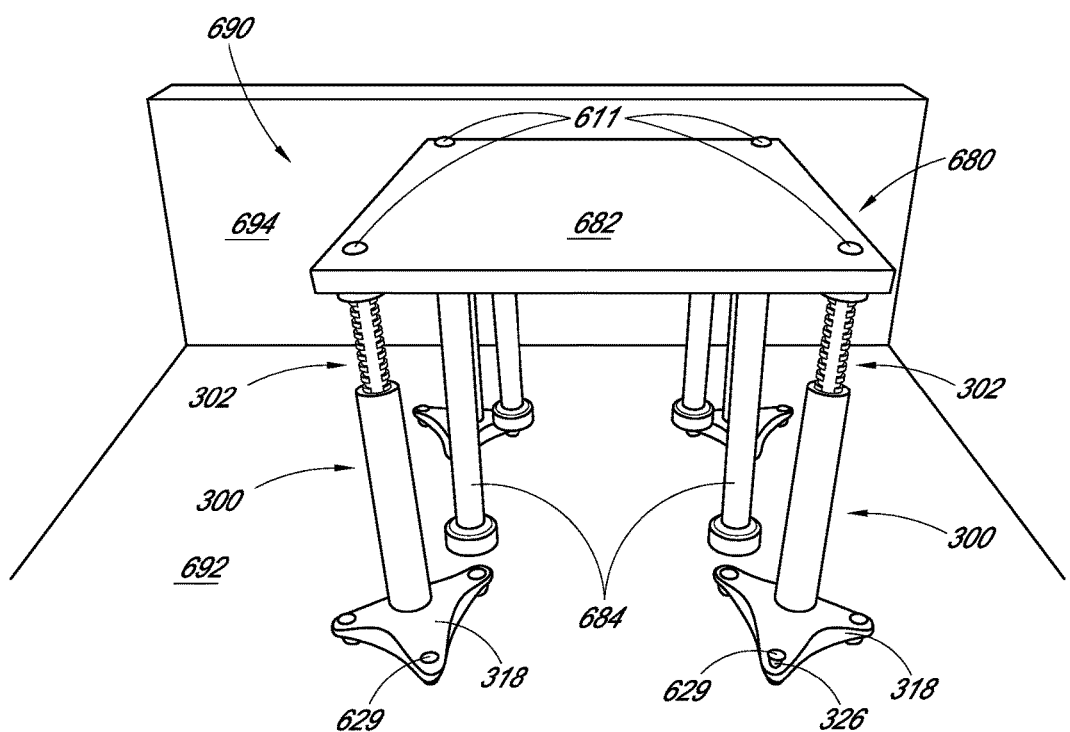
FIG. 6 is a photograph of a support within a concrete form supporting an embed.

FIG. 6 depicts a perspective view of multiple supports 300 being used in an application to support an embed 680 in a form 690, prior to concrete being poured. The embed 680 is a steel plate and includes a top surface 682, in which holes (not shown) are formed, and posts 684 which extend downward from the top surface 682. The supports 300 are attached to a bottom surface 692 of the form 690. The supports are securely held in place by nails 629 which are inserted into throughholes 326 of the base 318, and secured into the bottom surface.

The embed 680 is attached to the supports 300 via screws 611. The screws 611 pass through holes (not shown) in the top surface 692 of the embed 680, and into the pilot holes 310 formed in supports 300. The shafts 302 of the supports 300 have been set at the proper height and locked into place within the tower portions 316 as described elsewhere herein. The shafts have been set at the proper height such that the top surface 692 of the embed 680 is aligned with a top plane of a vertical portion 694 of the form 690, so that the top surface 692 will be flush with the finished surface of the concrete.

After the supports are secured to the form 690 and the embed 680 is secured to the supports, which are set at the desired height, the concrete (not shown) can be poured into the form. As the concrete is poured, the supports 300 will stay secured in place, and the concrete will flow around the supports 300 and the posts 684. The posts 684 will become securely fixed within the concrete. After the concrete has set, the embed 680 will be at the desired elevation within the concrete. The screws 611 can be removed from the holes in the top surface 682 and the pilot holes 310 in the supports 300. In this way, there is no need to build a rig or use other constructions to hold the embed 680 in place for concrete pouring. After the screws 611 are removed, there is no part of the support 300 protruding above the surface of the concrete. Nothing needs to be cut off, ground down, or removed, resulting in an efficient and effective way to position embed 680 within concrete.

Although embed 680, a steel plate, is shown herein, other embeds, such as electrical boxes, conduits, forms, and other objects can be embedded in concrete using the supports 300 described herein, without departing from the scope of the specification.

Figure 7A:
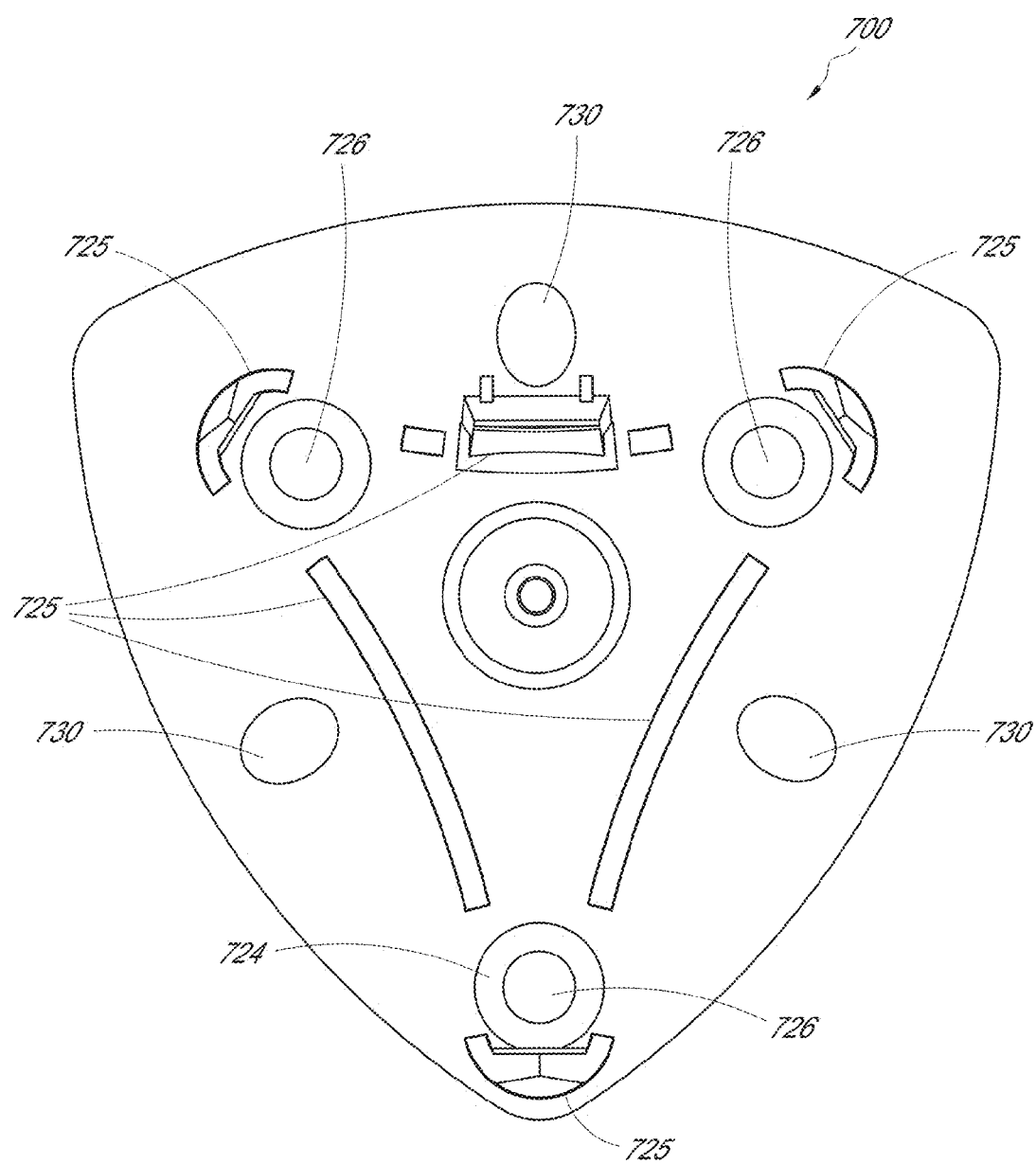
FIG. 7A is a perspective view of an embodiment of an attachment plate configured to attach to a support.
Figure 7B:
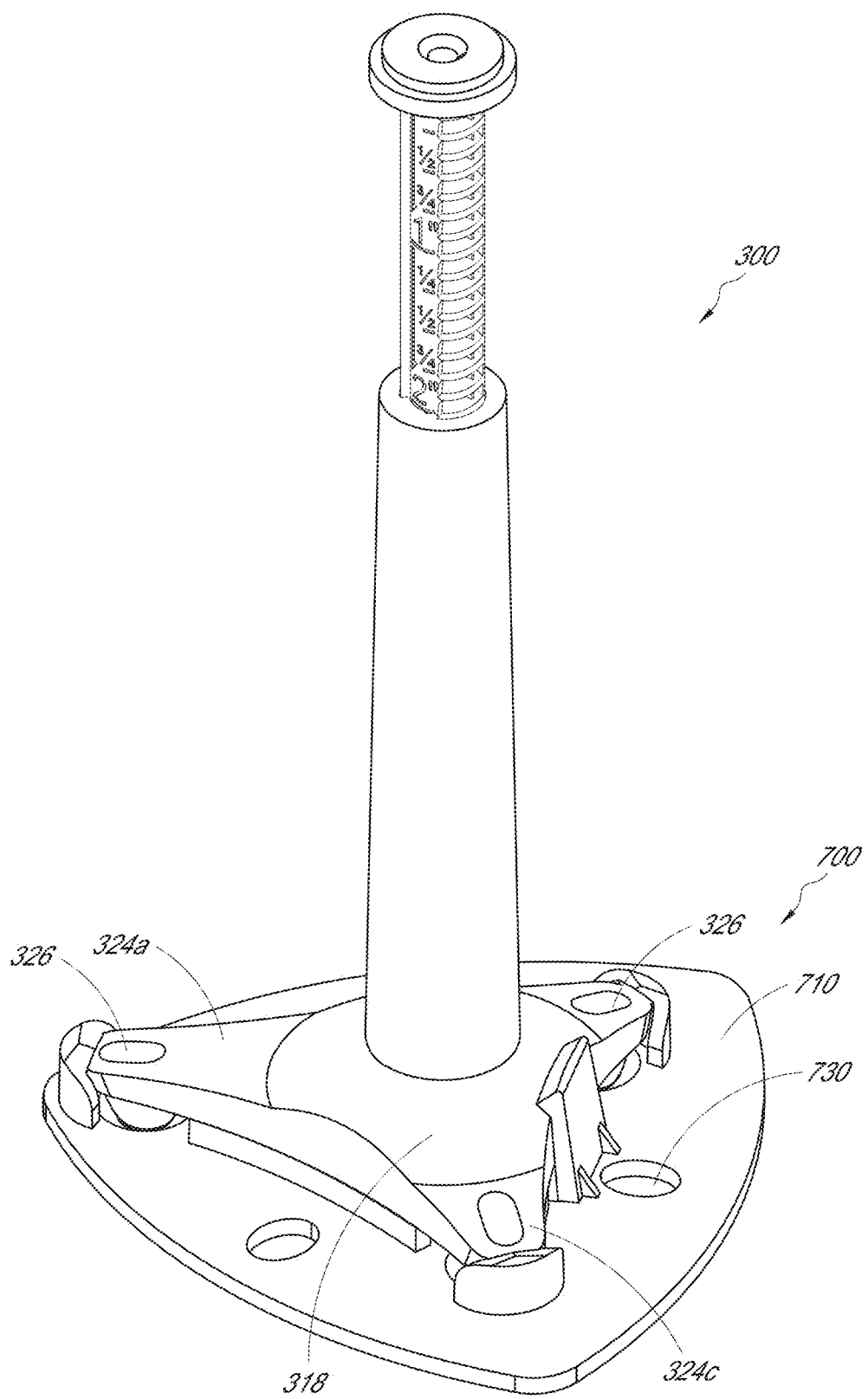
FIG. 7B depicts a perspective view of the attachment plate of FIG. 7A attached to a support.

FIG. 7A depicts an attachment plate 700 configured for use with the support 300 described herein. FIG. 7B depicts the support 300 attached to the attachment plate 700. The attachment plate 700 comprises a planar surface 710, guide surfaces 724, locking members 725, receiving holes 726, and attachment holes 730. The guide surfaces 724 are formed on the planar surface 710 and extend perpendicular upward from the planar surface 710. The guide surfaces have the same contour as, correspond to, or are configured to receive or mate with surfaces on the underside of the base 318. The locking members 725 are positioned on the planar surface at positions that correspond with the ends of the legs 324a-324c of the support 300. The locking members 725 are positioned to provide a snap fit or friction fit of the ends of the legs 324a-c when the support is placed onto the attachment plate 700. The receiving holes 726 correspond to the throughholes 326 and the feet 320 of the support 320. The receiving holes are formed in the planar surface 710, and, as shown, have a tapering inner diameter 724 as the receiving hole 726 extends through the planar surface. The tapering inner diameter is configured to correspond to a dimension of the feet 320 of the support 300. In this way, the receiving hole 726 receives the feet 320 of the support 300 such that the underside of the base 318 can contact or mate with the guide surfaces 742. The attachment holes 730 are formed as throughholes in the attachment plate 700. The attachment holes 730 can be distributed evenly around the attachment plate 700, and can be offset from the receiving holes 726. In some embodiments, there can be 1, 2, 3, or more attachment holes. The attachment holes 730 can have a larger diameter than the throughholes 326 in the support 300. In this way, the attachment holes 730 can receive a larger anchoring device, such as a larger nail, bolt, etc.

The attachment plate 700 can be used in an application where a concrete form is formed on a loose surface, such as gravel, dirt, and the like. Mounting the support 300 on such a loose surface may be difficult using only anchors inserted through the throughholes 326 in the base 318, as the smaller diameter anchors, such as nails, may not provide adequate support in a loose surface. The larger attachment holes 730 can allow for a larger diameter anchor, such as a nail or the like, to be inserted through the attachment holes 730 and into the loose surface to ensure the attachment plate 700 and the support 300 stay in place during concrete pouring. To use the attachment plate 700, the base 318 is inserted into the corresponding portions of the attachment plate 700. That is, the feet 320 are inserted into the receiving holes 726, and the ends of the legs 324a-c form a snap or friction fit with the locking members 725. The guide surfaces contact the underside of the base 318. In this way, the support 300 is securely, releasably attached to the attachment surface 700. The attachment surface 700 can be then anchored to the loose surface using appropriate anchors, which will keep the support 300 in place as concrete is poured into the frame. The object connected to the platform 306 will then be positioned within the concrete as desired. Of course, the steps of attaching the object to the platform 306, attaching the support to the attachment plate 700, and anchoring the attachment plate to the loose surface can be performed in any order, as desired.

The attachment plate shown and described is exemplary. A person of skill in the art, guided by this disclosure, would understand that the attachment plate 700 can vary based on the dimensions, shape, size, etc. of the support 300 to which the attachment plate 700 is configured to attach.

The various embodiments of the supports, methods, and systems described above provide a means to better position embeds for embedding in concrete. Of course, it is to be understood that not necessarily all objects or advantages may be achieved in accordance with any particular embodiment. Thus, for example, those skilled in the art will recognize that the invention may be embodied or carried out in a manner that achieves or optimizes one advantage or group of advantages as taught herein without necessarily achieving other objects or advantages as may be taught or suggested herein.

The foregoing description and claims may refer to elements or features as being "connected," "coupled," or "attached" together. As used herein, unless expressly stated otherwise, "connected" "coupled" and "attached" can mean that one element/feature is directly or indirectly connected to another element/feature, and not necessarily mechanically, or that two features are not necessarily discreet components, such as being integrally formed from a single cast, mold, and the like. Although the various schematics shown in the Figures depict example arrangements of elements and components, additional intervening elements, devices, features, or components may be present in an actual embodiment (assuming that the functionality of the depicted circuits is not adversely affected).

Although this invention has been disclosed in the context of certain embodiments and examples, it will be understood by those skilled in the art that the present invention extends beyond the specifically disclosed embodiments to other alternative embodiments and/or uses of the invention and obvious modifications and equivalents thereof. It is to be understood that the implementations are not limited to the precise configuration and components illustrated above. Thus, it is intended that the scope of the present invention herein disclosed should not be limited by the particular disclosed embodiments described above.

What is claimed is:

1. A support device comprising:
    a shaft, the shaft comprising:
        a rod;
        a platform attached to a first end of the rod;
        a plurality of locking grooves disposed along at least a portion of the rod; and
    a tower having an interior surface forming an opening in a first end of the tower, the opening configured to receive the shaft, wherein the interior surface comprises a locking member adapted to engage one of the plurality of locking grooves, the locking member comprising a first end, a second end, and a notch formed in the locking member at a point between the first end and the second end.

2. The support device of claim 1, wherein the tower further comprises:
    a base connected to a second end of the tower, the base comprising a plurality of legs extending radially from a central axis of the tower, the legs being formed having throughholes therein.

3. The support device of claim 1, wherein the shaft further comprises a plurality of measurement indicators thereon, the measurement indicators corresponding to the distance from a second end of the tower to the platform.

4. The support device of claim 1, wherein at least one of the plurality of the locking grooves comprises a ridge, the ridge sized and positioned to engage the notch in the locking member.

5. The support device of claim 1, wherein the plurality of locking grooves are formed radially around an outer surface of the rod.

6. The support device of claim 1, wherein the plurality of locking grooves are formed in parallel planes along a length of the rod.

7. The device according to claim 1, wherein the platform has a pilot hole formed therein.

8. The support device of claim 1, wherein the interior surface comprises two locking members disposed on opposite surfaces within the opening, and wherein the shaft comprises two sets of locking grooves disposed on opposite sides of the shaft.

9. The support device of claim 1, wherein the plurality of locking grooves is configured to rotatably receive the locking member.

10. A method of supporting an object comprising:
    placing a support device within a form, the support device comprising:
        a shaft, the shaft comprising:
            a rod;
            a platform attached to a first end of the rod;
            a plurality of locking grooves disposed along at least a portion of the rod;
        a tower having an interior surface forming an opening in a first end of the tower, the opening configured to receive the shaft, wherein the interior surface comprises a locking member adapted to engage one of the plurality of locking grooves;

inserting the shaft into the opening in the first end of the tower;

rotating the shaft to engage the locking member with one of the plurality of locking grooves;

attaching an object to the platform; and pouring concrete into the form around the support device, thereby embedding the object in the concrete at the predetermined height.

11. A method of supporting an object comprising:

placing a support device within a form, the support device comprising:
- a shaft, the shaft comprising:
  - a rod;
  - a platform attached to a first end of the rod;
  - a plurality of locking grooves disposed along at least a portion of the rod;
- a tower having an interior surface forming an opening in a first end of the tower, the opening configured to receive the shaft, wherein the interior surface comprises a locking member adapted to engage one of the plurality of locking grooves, wherein the locking member comprises a first end, a second end, and a notch formed in the locking member at a point between the first end and the second end; and wherein the locking channel comprises a ridge, the ridge sized and positioned to engage the notch in the locking member;

inserting the shaft into the opening in the first end of the tower; and rotating the shaft to engage the locking member with one of the plurality of locking grooves.

12. The method of claim 11 wherein rotating the shaft to engage the locking member with one of the plurality of locking grooves comprises rotating the locking channel to engage the ridge with the notch in the locking member.

13. The method of claim 11 wherein inserting the shaft into the opening comprises positioning the shaft within the opening to set the platform at a predetermined height.

14. The method of claim 11 further comprising attaching an object to the platform.

15. The method of claim 14 further comprising pouring concrete into the form around the support device, thereby embedding the object in the concrete at the predetermined height.

16. The method of claim 11, wherein the tower further comprises a base connected to a second end of the tower, the base comprising a plurality of legs extending radially from a central axis of the tower, the legs being formed having throughholes therein.

17. The method of claim 16 further comprising attaching the base to a substrate by inserting an attachment mechanism through the throughholes in the legs and into the substrate.

18. A support device comprising:
- a shaft, the shaft comprising:
  - a rod having a first diameter;
  - a platform attached to a first end of the rod, the platform having a pilot hole formed therein;
  - two sets of locking grooves disposed on opposite sides along at least a portion of the rod, wherein the locking grooves have a second diameter, which is larger than the first diameter; and
- a tower comprising:
  - a tower portion having a first end and a second end, the tower portion having an interior surface forming in an opening in a first end, the opening configured to receive the shaft, wherein the interior surface comprises two locking members disposed on opposing surfaces of the interior surface, each of the two locking members configured to engage one or more of each set of the locking grooves, respectively;
  - a base connected to a second end of the tower portion, the base comprising a plurality of legs extending radially from a center of the tower portion; and
  - a plurality of feet disposed on the plurality of legs.

19. The support device of claim 18, wherein the two sets of locking grooves are configured to rotatably receive the two locking members, respectively, to releasably lock the shaft in position within the opening.

* * * * *